United States Patent [19]

Bricker

[11] Patent Number: 4,741,750

[45] Date of Patent: May 3, 1988

[54] METHOD AND APPARATUS FOR COOLING IN A FLOAT GLASS FORMING OPERATION

[75] Inventor: Jack A. Bricker, Tarentum, Pa.

[73] Assignee: PPG Industries, Inc., Pittsburgh, Pa.

[21] Appl. No.: 28

[22] Filed: Jan. 2, 1987

[51] Int. Cl.$^4$ .................. C03B 18/16; C03B 18/18
[52] U.S. Cl. ........................... 65/99.3; 65/99.2;
 65/182.3; 65/182.5; 65/374.15
[58] Field of Search ............... 65/94, 99.3, 99.1, 99.2,
 65/99.4, 99.5, 182.1, 182.3, 182.4, 182.5, 374.15

[56] References Cited

U.S. PATENT DOCUMENTS

| | | |
|---|---|---|
| 3,645,713 | 2/1972 | Brichard . |
| 3,652,250 | 3/1972 | Brichard . |
| 3,770,407 | 11/1973 | Lawrenson . |
| 3,790,361 | 2/1974 | Lawrenson . |
| 4,197,106 | 4/1980 | Trevorrow et al. . |

*Primary Examiner*—Arthur Kellogg
*Attorney, Agent, or Firm*—Dennis G. Millman

[57] ABSTRACT

A float glass forming chamber is cooled by circulation of molten metal through passages separate from the molten metal pool upon which the glass is supported.

8 Claims, 2 Drawing Sheets

METHOD AND APPARATUS FOR COOLING IN A FLOAT GLASS FORMING OPERATION

This invention relates to improvements in the process of forming flat glass by casting molten glass onto the surface of molten metal known as the float process. The molten metal is usually tin, sometimes with minor amounts of other elements such as iron or copper included, and other metals such as silver have been suggested as theoretically feasible.

At the region where the molten glass is introduced onto the molten metal, the temperature of the glass is relatively high, and as the glass progresses along the elongated forming chamber, its temperature is allowed to fall to a point where the viscosity is sufficient to permit removing the glass from the molten support and onto mechanical conveying means. Therefore, removal of heat from the forming chamber is entailed and is conventionally performed by heat exchange means extended into the forming chamber above the glass. Proper control of the cooling is important in assuring the quality of the glass being produced. The water-cooled heat exchangers usually used have the disadvantage of creating a sharp thermal gradient that may be deleterious to glass quality. Moreover, these heat exchangers are restricted to the top side of the glass ribbon, and the underside of the ribbon may therefore cool more slowly, which can also have a negative effect on the distortion quality of the glass. Extending cooling conduits into the molten metal beneath the glass is not favored because of the corrosiveness of molten metal such as tin on metal conduits and because a water leak within the molten metal would be hazardous. Therefore, prior art proposals to cool the underside of the glass ribbon are characterized by withdrawing, cooling, and recirculating portions of the molten metal. An example of that approach is disclosed in U.S. Pat. No. 3,645,713 (Brichard). Such an approach has several difficulties. In order to avoid distorting the glass, the degree to which the metal can be cooled and the rate at which it can be circulated through the forming chamber are limited, thus restricting the rate of heat removal. Also, when tin is cooled, tin oxide tends to precipitate from the molten metal, which when reintroduced into the forming chamber can become deposited on the bottom surface of the glass ribbon, which is undesirable.

Another approach to cooling the molten metal in a float glass operation is disclosed in U.S. Pat. No. 3,770,407 (Lawrenson). There, the molten metal is cooled indirectly by means of carbon fins imbedded in the bottom of the forming chamber, which in turn are in contact with water-cooled pipes. A drawback of that arrangement is that the cooling rate is fixed by the conductivity of the carbon fins and thus is not adjustable. The use of water as the cooling medium also limits the variability of the cooling rate.

Recirculating the molten metal is also shown in U.S. Pat. Nos. 3,652,250 (Brichard) and 3,790,361 (Lawrenson). Both entail the problems of recirculating the molten metal noted above. U.S. Pat. No. 4,197,106 shows a water-cooled pipe embedded in the bottom of the forming chamber. It would have the disadvantages of inflexible cooling rate and a leak hazard as described above.

It would be desirable to provide cooling to the underside of a glass ribbon in a float forming chamber that avoided distorting or contaminating the glass, avoided hazardous juxtaposition of water and molten metal, and permitted wide adjustments of the cooling rate.

SUMMARY OF THE INVENTION

In the present invention the pool of molten metal, and thus the underside of the glass ribbon, in a float forming chamber is cooled by using indirect heat exchange with a molten metal coolant compatible with but maintained separate from the main pool of molten metal. Passages below the pool are provided for the coolant, and heat transfer takes place through the walls of the passages. Preferably, the passages are fabricated from a relatively good thermal conductor such as graphite. The coolant is advantageously of substantially the same composition as the molten metal of the main pool so that any leakage from the coolant passages will not contaminate the pool or the glass, nor cause a hazardous reaction with the molten metal of the pool. But because the coolant does not normally become commingled with the molten metal of the pool, slight compositional differences would not be objectionable. In particular, the presence of precipitated metal oxides in the relatively cool molten metal of the coolant does not contaminate the glass due to the separation of the two molten metal portions. Another advantage is that use of a separate coolant permits considerable variation of the heat exchange rate without disturbing the formation of smooth glass surfaces. The coolant temperature may be considerably below that of the molten metal pool since it is separate, but it can also be at nearly the same temperature if the amount of cooling is to be reduced. Additionally, since the cooling acts on the molten metal of the pool and only indirectly on the glass, sharp thermal gradients that can disturb the glass are avoided. Furthermore, the flow rate of the coolant can be varied without regard for disturbing the pool of molten metal. Other features and advantages of the invention will become evident from the drawings and the detailed description of the preferred embodiment that follows.

THE DRAWINGS

DETAILED DESCRIPTION

In this description of the preferred embodiment of the invention, the molten metal will be described as tin, but it should be understood that impurities or additives may be included and that the invention is not limited to any particular molten metal.

Figure 1:
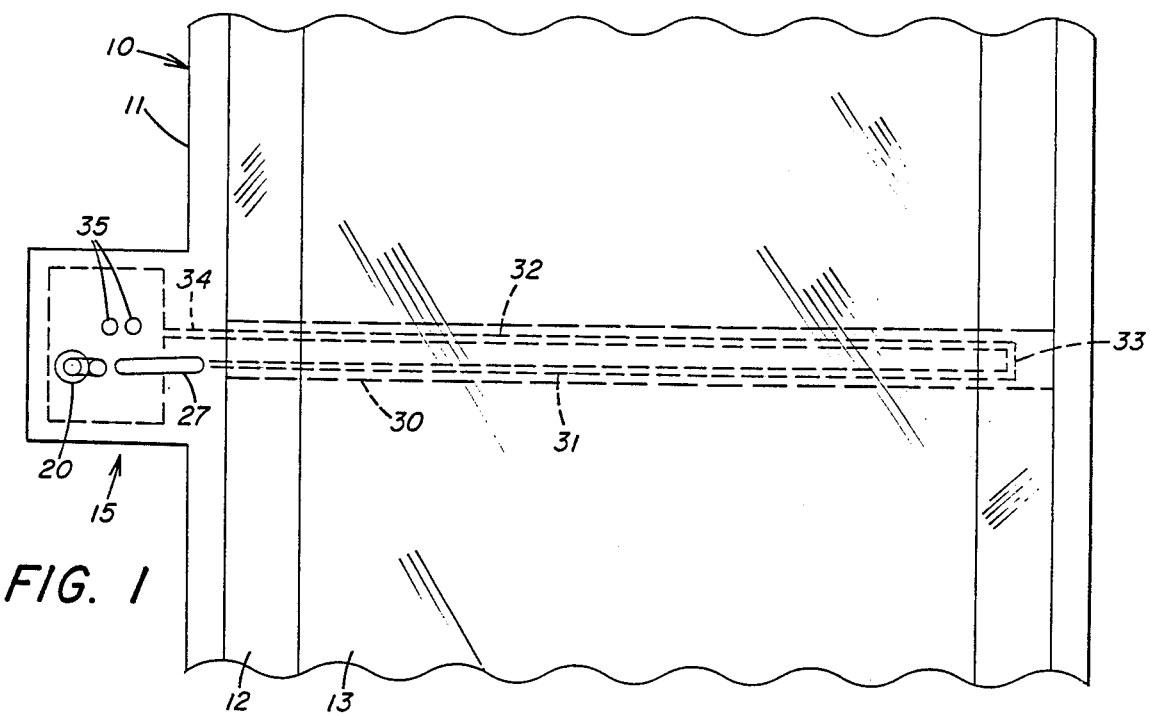
FIG. 1 is a plan view of a portion of a float glass forming chamber with the roof cut away, showing an example of a cooling system in accordance with a preferred embodiment.

In FIG. 1 there is shown an intermediate portion of an elongated float glass forming chamber 10 comprised of a refractory basin 11 adapted to hold a pool of molten tin 12. A ribbon of glass 13, still in the plastic state, floats on the tin and is drawn longitudinally along the chamber as the glass is attenuated to a desired thickness. As the glass progresses along the forming chamber, its temperature is permitted to fall, for example, from about 1900° F. (1040° C.) to about 1100° F. (600° C.). The tin, maintained at temperatures substantially below that of the glass, serves to conduct heat away from the glass.

Figure 2:
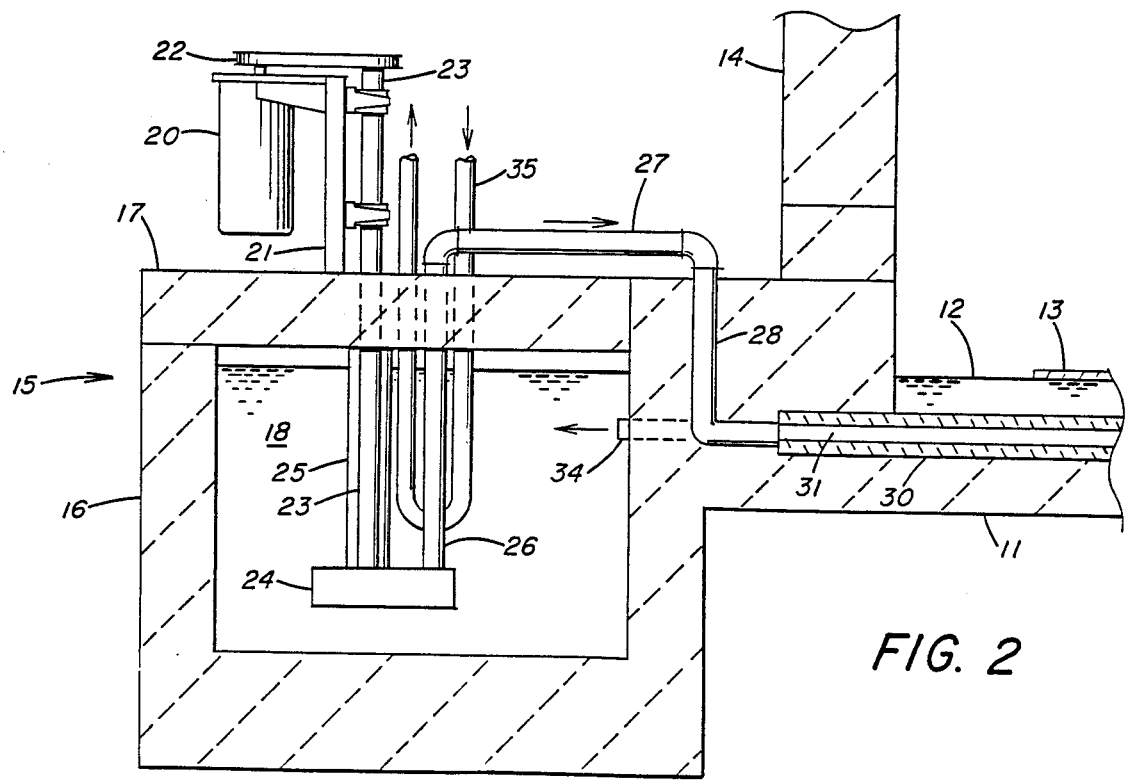
FIG. 2 is an enlarged vertical cross-section of a sump and pumping arrangement for a preferred embodiment of the cooling system of the invention.

In accordance with the present invention, a gathering chamber or sump 15 is appended to a side of the forming chamber basin 11 as shown in FIG. 1 for holding a quantity of the coolant molten tin. Greater details of the sump 15 are shown in FIG. 2. The sump may be comprised of a refractory basin 16 and a lid 17 and is adapted to hold a reservoir of molten tin 18. The sump is equipped with a pump for circulating the molten tin 18 through the cooling system. In the embodiment shown in the drawings, the pump may be comprised of a motor 20 on a bracket carried on the lid 17, a belt 22 driving a shaft 23, and an impeller 24 submerged in the tin 28 and driven by the shaft 23. The impeller may be supported from the lid 17 by a post 25. The impeller draws tin from the surrounding reservoir 18 and forces it through outlet pipe 26 and, by way of connecting pipes 27 and 28, to a cooling conduit 30 in the bottom of the forming chamber basin 11. The type of pump that may be employed for pumping molten tin is available commercially, such as Metaullics Pump Model D-12-C from Carborundum Co., Graphite Products Division, Solon, Ohio.

As can be seen in FIG. 1, the cooling conduit 30 extends transversely across the forming chamber in this embodiment, but it should be apparent that a wide variety of flow patterns could be employed. More than one conduit could extend from one sump, and a plurality of sumps may be employed. Here, the conduit 30 includes an inlet passageway 31 and a return passageway 32 connected together at the far end by a cross bore 33. A short pipe 34 returns the tin to the reservoir 18. The conduit 30 is preferably formed from an elongated block of graphite with the passages 31 and 32 bored therein. Depending upon the width of the forming chamber, the conduit may require two or more pieces of graphite spliced together. In the preferred embodiment the top of the conduit is flush with the interior bottom surface of the forming chamber. Alternatively, the cooling conduit could take the form of pipes submerged in the tin pool 12. Silicon carbide may be used as an alternative to graphite as a material for the conduit.

Figure 3:
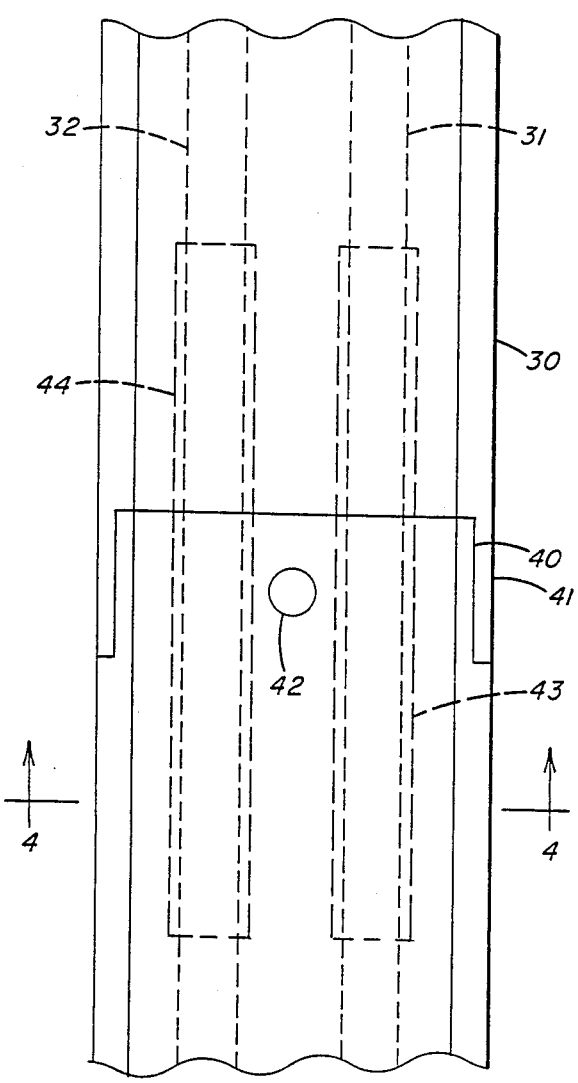
FIG. 3 is a further enlarged top view of a section of molten metal coolant conduit, showing details of a joint structure.
Figure 4:
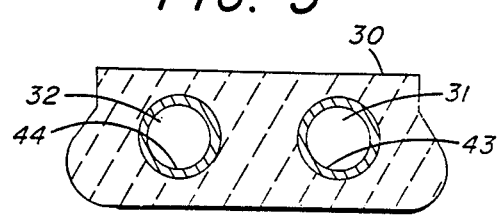
FIG. 4 is a vertical sectional view of the conduit taken along line 4—4 in FIG. 3.
Figure 5:
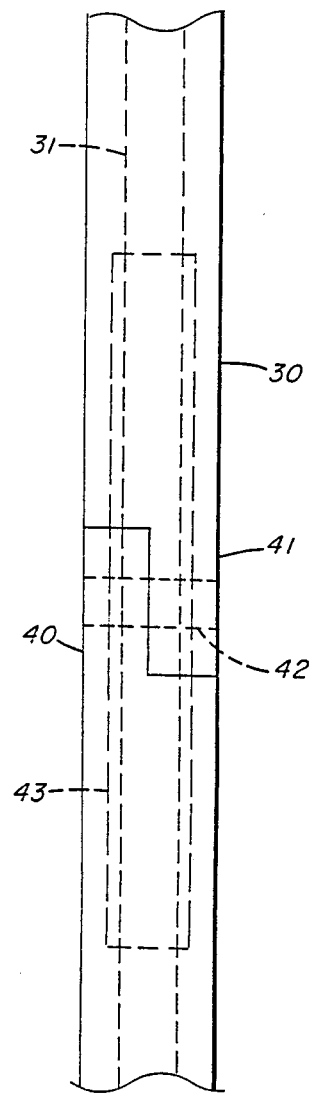
FIG. 5 is a side view of the conduit and joint of FIG. 3.

In the event that the conduit 30 is assembled from a plurality of pieces, a suitable joint arrangement is shown in FIGS. 3, 4, and 5. A ship-lapped joint is provided with upper and lower tabs 40 and 41 overlapping each other and a pin 42 extending through both pieces to bind them together. Sleeves 43 and 44 may be inserted in the passageways 31 and 32 spanning the joints so as to prevent leakage. The sleeves may be silicon carbide tubes.

The cross-sectional shape of the cooling conduit shown in FIG. 4 includes a widened bottom portion for the sake of securing the conduit against buoyant forces when it is cast into the forming chamber bottom. Other shapes and provisions for anchoring the conduit may be employed.

Heat gained by the tin during circulation through the conduit 30 is removed in the sump by a cooler 35. The cooler may be in the form of a simple hairpin shaped pipe cooler as shown in FIG. 2 through which water is passed. Because of the low temperature of the water cooled pipe 35, it may be fabricated of stainless steel or the like. It is preferred to maintain the tin 18 in the sump at an approximately constant temperature during operation, and the rate of heat removal from the sump may be controlled by varying the depth to which the cooling pipe 35 is immersed in the tin. Although temperatures around 500° F. (260° C.) are theoretically feasible, it is preferred to maintain the coolant tin above 600° F. (310° C.) to assure that the tin does not solidify in any portion of the system. The rate of heat extraction from the forming chamber is controlled not only by the coolant tin temperature but also by the coolant flow rate. Both modes of control are advantageously versatile and easy to manipulate compared to prior art forming chamber cooling means. By way of example, in a region of the forming chamber where the temperature of the tin pool 12 was approximately 1380° F. (750° C.), a beneficial cooling effect was established by pumping tin through the conduit arrangement shown in the drawings at a rate of approximately 1100 pounds per minute (500 kilograms per minute) while the tin temperature in the sump was maintained at about 1000° F. (540° C.).

The invention has been described with reference to a particular, preferred embodiment, but it should be understood that other variations and modifications as would be known to those of skill in the art may be resorted to within the scope of the invention as defined by the claims which follow.

I claim:

1. A method of forming glass wherein molten glass is passed onto a pool of molten metal in a forming chamber and is shaped into flat glass while floating on the molten metal pool, the glass loses heat to the surroundings in the forming chamber, and heat is removed from the forming chamber, characterized by at least a portion of the heat removal from the forming chamber being carried out by circulating molten metal coolant beneath the glass separately from the molten metal pool.

2. The method of claim 1 wherein the molten metal coolant is passed through a conduit in contact with the molten metal pool.

3. The method of claim 1 wherein the molten metal pool and the molten metal coolant are of substantially the same composition.

4. The method of claim 3 wherein the molten metal is principally comprised of tin.

5. The method of claim 2 wherein the molten metal coolant is pumped from a reservoir to the conduit and the molten metal coolant is cooled in the reservoir.

6. The method of claim 2 wherein heat is transferred from the molten metal pool to the molten metal coolant through a graphite barrier.

7. Apparatus for forming flat glass comprising a chamber adapted to hold a pool of molten metal, means for delivering molten glass onto the pool, a graphite member below the surface of and in contact with the molten metal pool, the graphite member being provided with a passageway in communication with pumping means adapted to convey molten metal coolant through the passageway in the graphite member separately from the molten metal pool.

8. The apparatus of claim 7 further including a chamber adapted to hold a reservoir of molten metal coolant in communication with the passageway, and cooling means in the chamber for cooling the molten metal coolant.

* * * * *